US011683228B2

(12) United States Patent
Pethe

(10) Patent No.: US 11,683,228 B2
(45) Date of Patent: Jun. 20, 2023

(54) AUTOMATICALLY MANAGING A ROLE OF A NODE DEVICE IN A MESH NETWORK

(71) Applicant: MASTERCARD INTERNATIONAL INCORPORATED, Purchase, NY (US)

(72) Inventor: Ameya Pethe, Lake Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/523,395

(22) Filed: Nov. 10, 2021

(65) Prior Publication Data

US 2022/0150109 A1 May 12, 2022

Related U.S. Application Data

(60) Provisional application No. 63/111,810, filed on Nov. 10, 2020.

(51) Int. Cl.
| | |
|---|---|
| *G06F 15/16* | (2006.01) |
| *H04L 41/082* | (2022.01) |
| *H04L 45/02* | (2022.01) |
| *H04L 41/08* | (2022.01) |
| *H04L 9/40* | (2022.01) |
| *H04L 45/00* | (2022.01) |

(52) U.S. Cl.
CPC ........ *H04L 41/082* (2013.01); *H04L 41/0886* (2013.01); *H04L 45/02* (2013.01); *H04L 45/38* (2013.01); *H04L 63/0209* (2013.01)

(58) Field of Classification Search
CPC ... H04L 41/082; H04L 41/0886; H04L 45/02; H04L 45/38; H04L 63/0209
See application file for complete search history.

(56) References Cited

U.S. PATENT DOCUMENTS

| | | | |
|---|---|---|---|
| 8,099,479 B2 | 1/2012 | Saint-Hilaire | |
| 2004/0073678 A1 | 4/2004 | Border et al. | |
| 2011/0082921 A1* | 4/2011 | Breslin | H04L 41/12 709/221 |
| 2013/0151675 A1 | 6/2013 | Kuehnel et al. | |
| 2016/0072674 A1 | 3/2016 | Nolan et al. | |
| 2016/0337185 A1 | 11/2016 | Hardison et al. | |
| 2016/0352577 A1 | 12/2016 | Schiff et al. | |
| 2020/0344599 A1* | 10/2020 | Duo | H04W 60/00 |

\* cited by examiner

*Primary Examiner* — Normin Abedin
(74) *Attorney, Agent, or Firm* — Barta, Jones & Foley, PLLC

(57) ABSTRACT

The disclosure herein describes automatically managing a role of a node device in a mesh network. Based on connecting the node device to a target device via a network connection, status data of the target device is obtained. If the status data indicates the target device is a mesh node device, the node device activates a virtualized mesh node operating system. If the status data indicates the target device is a device that is separate from the mesh network, the node device activates a virtualized egress node operating system. The node device updates the mesh network configuration based on which virtualized operating system was activated and then shares the updated mesh network configuration to the other node devices of the mesh network, whereby the mesh network is configured to route network traffic data between the node device and the target device based on the updated mesh network configuration.

20 Claims, 7 Drawing Sheets

AUTOMATICALLY MANAGING A ROLE OF A NODE DEVICE IN A MESH NETWORK

CROSS-REFERENCE TO RELATED APPLICATION

This application claims the benefit of U.S. Provisional Application No. 63/111,810, filed Nov. 10, 2020, entitled "AUTOMATICALLY MANAGING A ROLE OF A NODE DEVICE IN A MESH NETWORK", the entirety of which is hereby incorporated by reference herein.

BACKGROUND

Mesh networks are networks of computing devices organized and configured to cooperate with each other to efficiently route data traffic. While mesh networks can provide data routing benefits, initially configuring or changing the configuration of a mesh network to account for more, fewer, or different sets of computing devices requires time and manual effort from technicians or other users. For instance, adding a new computing device to a mesh network requires that the new computing device be configured to operate in the mesh network as well as reconfiguring the other computing devices in the mesh network to cooperate with the new computing device. Additionally, or alternatively, connecting an existing mesh network to an external network requires that the computing device to which the external network is connected be reconfigured as an egress to the external network, rather than as an internal node in the mesh network. Such configurations require a user to perform manual operations to update the configuration of all computing devices in the mesh network to reflect the changes made.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for automatically managing a role of a node device in a mesh network is described. Based on connecting the node device to a target device via a network connection, status data of the target device is obtained. If the status data indicates the target device is configured as a mesh node device, the node device activates a virtualized mesh node operating system that configures the node device to route network traffic to at least the target device based on a mesh network configuration. Alternatively, if the status data indicates the target device is configured as a device that is separate from the mesh network to which the node device is connected, the node device activates a virtualized egress node operating system that configures the node device to route network traffic into or out of the mesh network via the network connection to the target device. The node device updates the mesh network configuration based on which virtualized operating system was activated and/or on the status data of the target device and then shares the updated mesh network configuration to the other node devices of the mesh network, whereby the mesh network is configured to route network traffic data between the node device and the target device based on the updated mesh network configuration.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
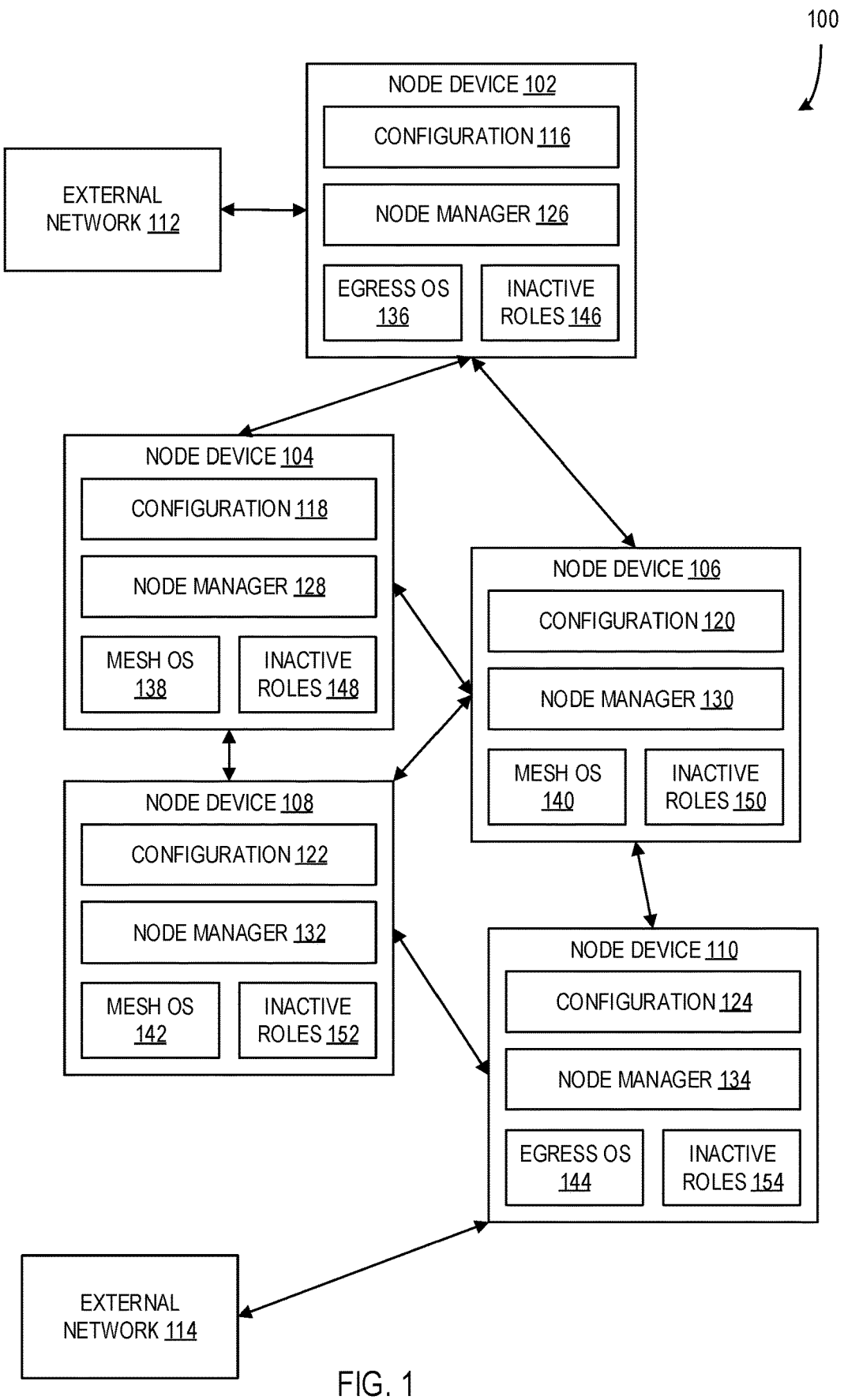
FIG. 1 is a block diagram illustrating a system configured for routing data traffic through a mesh network of node devices according to an embodiment.

Aspects of the disclosure provide a computerized method and system for automatically managing a role of a node device in a mesh network. Based on connecting the node device to a target device via a network connection, status data of the target device is obtained. If the status data indicates the target device is configured as a mesh node device, the node device activates a virtualized mesh node operating system that configures the node device to route network traffic to at least the target device based on a mesh network configuration. Alternatively, if the status data indicates the target device is configured as a device that is separate from the mesh network to which the node device is connected, the node device activates a virtualized egress node operating system that configures the node device to route network traffic into or out of the mesh network via the network connection to the target device. The node device updates the mesh network configuration based on which virtualized operating system was activated and/or on the status data of the target device and then shares the updated mesh network configuration to the other node devices of the mesh network, whereby the mesh network is configured to route network traffic data between the node device and the target device based on the updated mesh network configuration.

The described mesh network method and system addresses the challenges associated with configuring and maintaining complex mesh networks of computing devices. Mesh node devices configured to operate as described herein automatically detect when they are connected to a mesh network with which they are compatible and, as a result of detecting the connection, configure themselves to perform an appropriate role in the mesh network. Further, the mesh node devices are configured to dynamically generate mesh node configurations based on a current arrangement of the mesh network, test the generated configurations, and share the configurations to the other devices in the mesh network, such that the configuration of the mesh network is synchronized across the devices of the network and kept up-to-date as nodes are added, removed, or changed. Additionally, the described node devices operate in an unconventional way in that they activate and host virtualized role-based operating systems (OS's) based on the role they determine from the current mesh network configuration. This enables a single node device to perform the operations of all required roles at different times and to smoothly transition between roles without manual intervention by a user. The described features reduce the amount of time and manual effort required of users to maintain the mesh node system. Further, the use of computing resources, such as processing and memory resources of the node devices and the available bandwidth resources within the mesh network, are reduced at least by enabling the node devices to dynamically switch between roles and even perform multiple roles during the transition between two roles (e.g., a node device that performs operations as a mesh node and an egress node during a period of transition from the mesh node role to the egress node role), reducing requirements to add and/or remove nodes based on changing needs of the mesh network.

FIG. 1 is a block diagram illustrating a system 100 configured for routing data traffic through a mesh network of node devices according to an embodiment. The system 100 includes a several node devices 102-110 that are configured to communicate and cooperate to route data throughout the mesh network and/or to and/or from external networks 112-114. It should be understood that the mesh network as illustrated in system 100 is made up of the node devices 102-110 and the external networks 112-114 are outside of the mesh network. Each node device 102-110 is a computing device that includes hardware, firmware, and/or software configured to perform the operations described herein. In some examples, each node device 102-110 is a networking device, such as a switch device, router device, or other similar computing device, while in other examples, the node devices 102-110 include a variety of devices, such as server devices, personal computers, laptops, tablets, or the like. The node devices 102-110 are configured to communicate with each other over network connections, which include wired connections (e.g., local area network (LAN) connections) and/or wireless connections (e.g., Wi-Fi connections).

Each node device 102-110 includes a configuration 116-124 respectively and a node manager component 126-134 respectively. The configuration of a node device includes configuration data that defines the current behavior of the node device with respect to routing data to, from, and/or through the mesh network. The configuration may be stored in the each node device 102-110 in the form of a data file or other data structure and it may be accessed by operating systems (OS's) and/or other software applications of the node devices to manage the transfer of data along network connections to other node devices in the mesh network and/or devices in external networks 112-114. In some examples, the configurations 116-124 of the node devices 102-110 include routing data, such as routing tables and/or routing functions, that define paths through the mesh network on which data traffic may be routed (e.g., routing data from external network 112 to node device 110 includes receiving the data by node device 102, routing the data to node device 106, and then routing the data to node device 110). The routing data may include alternate paths for routing data between two points in the mesh network and/or the external networks 112-114. Further, alternative routes in the routing data may be prioritized, such that one route is favored over other routes (e.g., the route that requires the fewest "hops" or transfers between node devices). Additionally, or alternatively, the configurations 116-124 of the node devices 102-110 may be synchronized dynamically, such that, when the configuration of a node device in the mesh network changes, the change may be shared with other node devices in the mesh network, enabling synchronized routing of data traffic. The routing operations associated with configurations of node devices are described in greater detail below with respect to FIG. 2.

The node managers 126-134 of the node devices 102-110 include hardware, firmware, and/or software configured for managing the dynamic operations of the node devices, including changing the roles of the node devices and generating and testing new or updated configuration data for use in the mesh network. Further, the node manager component of each node device is configured to store data that is used during its operations, such as data associated with routing data and/or the generation thereof, or signature information and/or other identifying information of the node device. In some examples, the node manager of a node device is configured to detect when a connection is formed with another device (e.g., other node devices or different types of devices) and to communicate with the newly connected device. In the course of those communications, the node manager is configured to determine whether the new connection is with a node device that is configured for operation in a mesh network or another type of device that is not configured to operate in the mesh network. The node manager includes control functions that are used to evaluate the current state of the new connection, the node device, and any mesh network of which the node device may already be a part. Based on these control functions, the node manager of the node device is configured to perform operations that change the state of the node device to fit a new network configuration, such as changing the role of the node device from a mesh node to an egress node, activating firewall or other access control operations on the node device, and/or generating, testing, and sharing a new configuration to other nodes of the mesh network. The node manager and associated operations are described in greater detail below with respect to FIG. 2.

Each node device 102-110 further includes an active, or activated, operating system (OS) 136-144 and one or more inactive roles 146-154. It should be understood that the active OS is an OS that is currently being executed by the node device and activating an OS may include setting up, configuring, and/or initializing an OS and then executing the OS and/or causing the OS to be executed on the node device in any manner without departing from the description herein. As illustrated, the node devices 102 and 110 have active egress OS's 136 and 144 respectively while the node devices 104, 106, and 108 have mesh OS's 138, 140, and 142, respectively. The active OS of a node device is configured to control the operations of the node device such that the node device performs the active role associated with the active OS. For instance, node 102 has an active egress OS 136 and, as a result, it operates as an egress node for routing data traffic of the mesh network to and from the external network 112. In another examples, node device 104 has an active mesh OS 138 and, as a result, it operates as mesh node that is internal to the mesh network and routes data traffic between other mesh nodes and egress nodes of the mesh network.

The inactive roles of a node device include data associated with other types of OS's that can be activated on the node for the node to operate in a different role. In some examples, each node device 102-110 includes OS data enabling the performance of the same set of roles (e.g., an egress node role, a mesh node role, a firewall node role). When the state of the mesh network changes (e.g., a new node is added, a node is removed, or a new connection to an external network is formed), the node manager of the node device may reconfigure the node device to operate as a different role. For instance, in an example, if another external network connection is made to the node device 104, the node manager 128 detects the new connection, determines that it is an external network connection and not an internal mesh network connection, and activates an egress node role of the node device 104 from the inactive roles 148. The activation of the egress node role includes activating an egress OS of the node device 104 and deactivating the mesh OS 138 of the node device 104. Further, the node manager 128 may generate a new configuration 118 based on the changing role of the node device 104. The new configuration 118 may also be shared to other node devices in the mesh network such that all the node devices 102-110 are configured to route data traffic in a synchronized way, as described herein.

Figure 2:
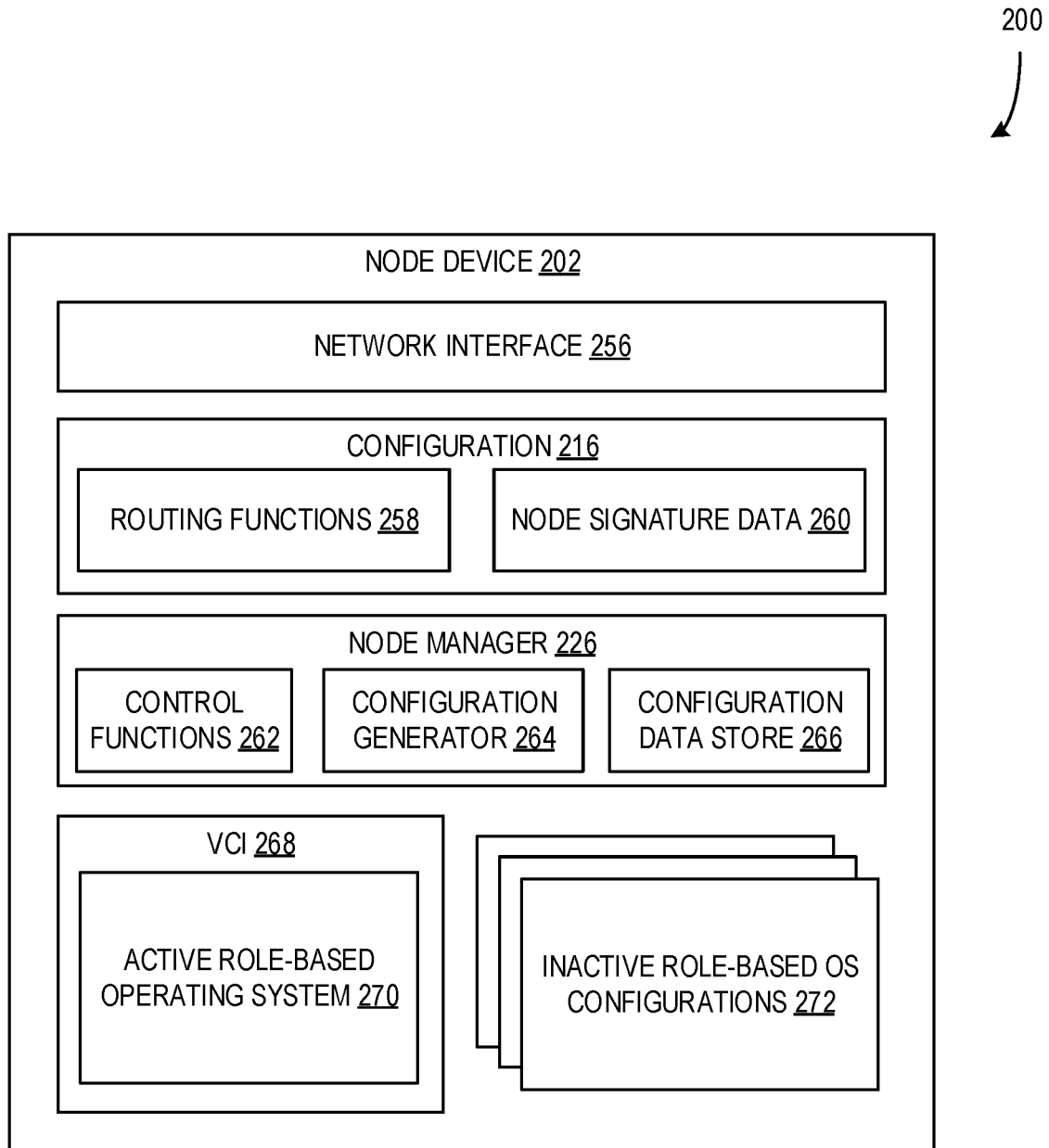
FIG. 2 is a block diagram illustrating a node device configured for dynamically integrating in a mesh network with other node devices according to an embodiment.

FIG. 2 is a block diagram 200 illustrating a node device 202 configured for dynamically integrating in a mesh network with other node devices according to an embodiment. In some examples, the node device 202 is part of or otherwise associated with a mesh network system such as system 100 of FIG. 1 described above. The node device 202 includes a configuration component 216 and a node manager 226 as described above with respect to the components of node devices 102-110, as well as a network interface 256. The active OS of the node device 202 includes an active role-based OS 270 that is executed using a virtual computing instance (VCI) 268 of the node device 202. Further, the node device includes multiple inactive role-based OS configurations 272 associated with the inactive roles (e.g., inactive roles 146-154) described above.

The network interface 256 of the node device 202 includes hardware, firmware, and/or software configured to establish network connections with other devices (e.g., wired connections or wireless connections) and to send data to and/or receive data from those other devices. In some examples, the network interface 256 includes one or more hardware network ports and associated firmware and/or software drivers or other associated applications. The active role-based OS 270 of the node device 202 is configured to interact with or otherwise make use of the network interface 256 based on the configuration 216 when performing data routing operations and/or other operations as described herein.

The configuration 216 of the node device 202 includes routing functions 258 and node signature data 260. As described above, the configuration 216 is used by the node device 202 to determine how to route data traffic to other connected node devices or other devices. In some examples, the configuration 216 include code and/or associated data that can be changed and/or adjusted as the configured device operates and gathers data about the traffic being routed. The routing functions 258 are defined to determine destinations for data traffic based on evaluating the target destination for the data traffic and/or other features of the data traffic. For instance, a routing function 258 may be defined for node device 202 that determines that, when data traffic is received with a target destination of a first destination node device, the data traffic is to be routed to a second destination node device (e.g., the second destination node device may be the shortest route between node device 202 and the first destination node device). Alternatively, or additionally, the routing functions 258 may include functions for multiple routes to a target destination, enabling the node device 202 to route data traffic along different routes (e.g., to reduce congestion along a particular route, to respond to detected errors along a particular route, or the like). In some examples, the routing functions 258 include functions associated with a destination are prioritized, such that the highest priority route is selected from the routing functions unless an issue with the route is identified (e.g., a threshold amount of data traffic is routed along the route, raising the likelihood of congestion along the route). The priority of routing functions 258 may be defined based on prioritizing the shortest routes between two devices (e.g., the fewest number of transfers between different devices). Alternatively, other methods of prioritizing routing functions may also be used without departing from the description (e.g., performance of each route may be monitored, and higher performance routes may be prioritized over lower performance routes).

The node signature data 260 of the configuration 216 includes node signature data associated with the node device 202 as well as node signature data associated with other devices within the mesh network to which the node device 202 is connected. The node signature of the node device 202 includes at least an identifier of the node device 202 and a configuration indicator indicating that the node device 202 is configured for use in a mesh network as described herein (e.g., the node device 202 is configured to route data traffic in a mesh network and to dynamically change roles and/or configurations based on changes made in the mesh network). In some examples, the node signature data 260 further includes information indicating other devices to which the node device 202 is connected. Additionally, or alternatively, the node signature data 260 includes mesh connectivity information indicating how all the current devices in the mesh network are interconnected to each other. The node signature data 260 may be referenced by the routing functions 258 when they are evaluated during data traffic routing (e.g., a routing function may refer to a destination device by a node signature identifier that is stored in the node signature data 260. Further, the node signature data 260 of a node device 202 may be shared with other devices upon a connection being detected to the other devices and/or the node signature data 260 may be used by the configuration generator 264 of the node manager 226 to generate a new or updated configuration 216 as described herein.

The node manager 226 includes control functions 262, a configuration generator 264, and a configuration data store 266. The control functions 262 of the node manager 226 include functions that manage the operations of the node device 202, including responding to detected connections to other devices, activating, deactivating, or otherwise managing role-based OS's of the node device 202, and/or generating, testing, and sharing configurations for the connected mesh network. In some examples, the control functions 262 may also be used generate reports associated with the current configuration and/or network data traffic flow. It should be understood that, in some examples, the control functions 262 of the node device 202 are configured to perform the operations for creating a mesh network, changing roles within a mesh network, and managing the configuration of a mesh network as described herein.

The configuration generator 264 of the node manager 226 is configured to generate a configuration file or other configuration data structure that defines a configuration of the mesh network to which the node device 202 is connected based on the current state of the mesh network. Each node device of the mesh network includes a configuration (e.g., configuration 216) that is used by the node device to route data traffic and otherwise interact with devices in the mesh network in a synchronized manner. When node device 202 detects a change to the structure of the mesh network (e.g., node device 202 switches roles from a mesh node role to an egress node role), a control function 262 of the node device 202 causes the configuration generator 264 to generate a new configuration 216 based on the detected structure change of the mesh network. Further, the configuration generator 264 may be configured to generate configurations and enable the setup of any unconfigured devices that are connected to the mesh network and/or the device associated with the configuration generator 264.

In some examples, to generate a configuration, the configuration generator 264 accesses data stored in the configuration data store 266. The configuration data store 266 may include data associated with the generation of routing functions 258. Further, the configuration generator 264 may access node identification data, such as the node signature data 260 of the configuration 216 or other node signature data that indicates the node devices that are currently part of the mesh network. In some examples, the configuration generator 264 is configured to generate a configuration with one or more routing functions based on the current set of node devices in the mesh network. For instance, the configuration generator 264 may analyze the set of node devices of the mesh network and how those nodes are interconnected in order to identify the shortest routes (e.g., routes with the least hops or transfers between devices in the network) through the mesh network between each node and generate routing functions of the configuration that describe those shortest routes. As a result, the newly generated configuration includes routing functions that route data traffic between devices along the identified shortest routes. The newly generated configuration may then replace the current configuration 216 of the node device 202, such that the node device 202 routes data traffic according to the newly generated configuration. Further, the newly generated configuration may be shared to other devices in the mesh network such that devices of the mesh network route data traffic in a synchronized manner. Additionally, or alternatively, the node manager 226 and/or the node device 202 may be configured to test the newly generated configuration before replacing the current configuration 216 and/or sharing the newly generated configuration with other devices in the mesh network.

The active OS of the node device 202 is an active role-based OS 270 that is executed on a VCI 268. In some examples, the OS 270 may be configured to cause the node device 202 to operate as a mesh node or an egress node in the mesh network. Additionally, or alternatively, the OS 270 may be configured to cause the node device 202 to perform firewall operations, other access control operations, or operations associated with other roles in the mesh network without departing from the description herein.

In some examples, the VCI 268 is a virtual machine configured to execute at least the OS 270 and/or other role-based OS configurations (e.g. the inactive role-based OS configurations 272). Further, while only one VCI 268 is illustrated, in other examples, the node device 202 is configured to create and manage multiple virtual machines or other VCIs with separate active OS's that configure the node device 202 to operate according to multiple roles. For instance, when the node device 202 is transitioning between roles as described herein, the node device 202 may temporarily have two active OS's on two separate VCI's, including one active OS associated with the current role and one active OS associated with the role to which the node device 202 is transitioning.

The inactive role-based OS configurations 272 include a plurality of configurations that, when activated as OS's of the node device on VCI's as described herein, cause the node device 202 to operate according to the associated role. The role-based OS configurations 272 may include mesh node OS configurations, egress node OS configurations, firewall and/or other access control OS configurations, and/or other OS configurations without departing from the description herein.

In some examples, based on the current role of the node device 202, the different types of software executed on the node device 202 as described herein may include L2, or data link layer, function software according to the Open Systems Interconnection (OSI) model and/or L3, or network layer, function software according to the OSI model. L2 function software handles OSI layer 2 packet forwarding functionality. It keeps a record of the Media Access Control (MAC) addresses connected to the network ports and associated network assigned to the software. In some examples, a node device is configured to execute L2 function software by default when powered up, such that the default role of a node device is that of a network switch or other similar role associated with OSI L2 functionality. In this role, the node device does not provide routing functions between two separate networks. The OSI L2 function software may support virtual local area network (VLAN) and port trunking functionality.

Alternatively, or additionally, the node device 202 may be configured to execute OSI L3 function software that handles OSI layer 3 packet forwarding functionality. For instance, devices operating as egress nodes may execute L3 software with an assigned external port that is connected to a device external to the mesh network. In some examples, the L3 software keeps a record of routes for internal networks and any external networks and provides the functionality of a network router. Further, any node device of a mesh network may be configured to perform firewall operations using firewall function software to provide firewalling and access control during network traffic routing.

Figure 3:
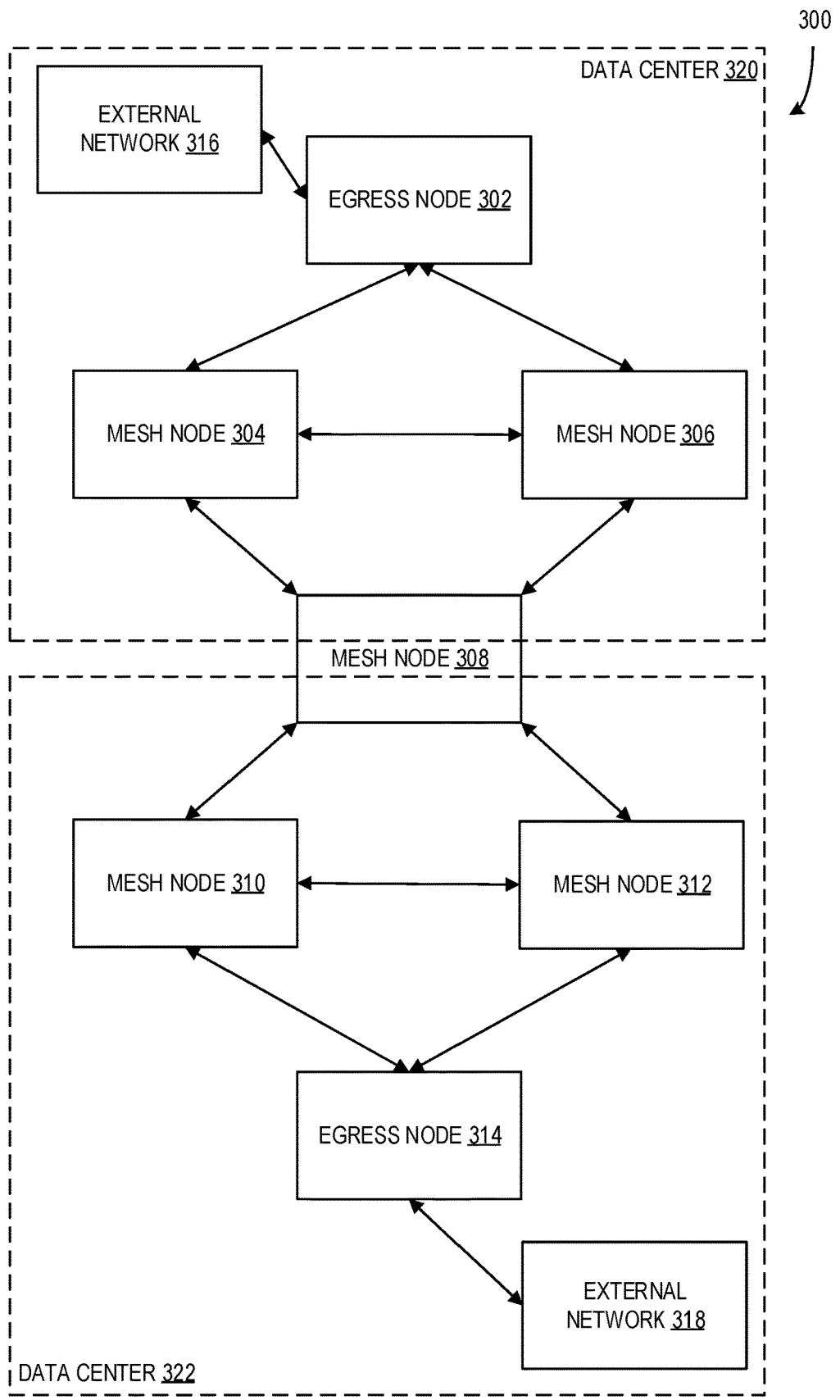
FIG. 3 is a block diagram illustrating a system configured for routing data within and between two data centers distributed in a mesh network according to an embodiment.

FIG. 3 is a block diagram illustrating a system 300 configured for routing data within and between two data centers 320 and 322 distributed in a mesh network according to an embodiment. The mesh network includes node devices 302-314, with egress nodes 302 and 314 and mesh nodes 304, 306, 308, 310, and 312. The two data centers 320 and 322 are distributed across the mesh network, such that data operations of the two data centers 320 and 322 are performed via routing of data traffic within the mesh network. In some examples, the mesh node 308 acts as a bridge between the two data center 320 and 322, providing an OSI L2 encrypted network extension between the two data centers. Further, in some examples, the mesh node 308 provides OSI L2 encryption and OSI L3 functionality, is configured to set up associated connections, and includes two devices (one at each site) that are virtualized and behave as a single device. It should be understood that, in other examples, other arrangements of more, fewer, or different node devices may be used to enable one or more data centers without departing from the description herein.

Figure 4:
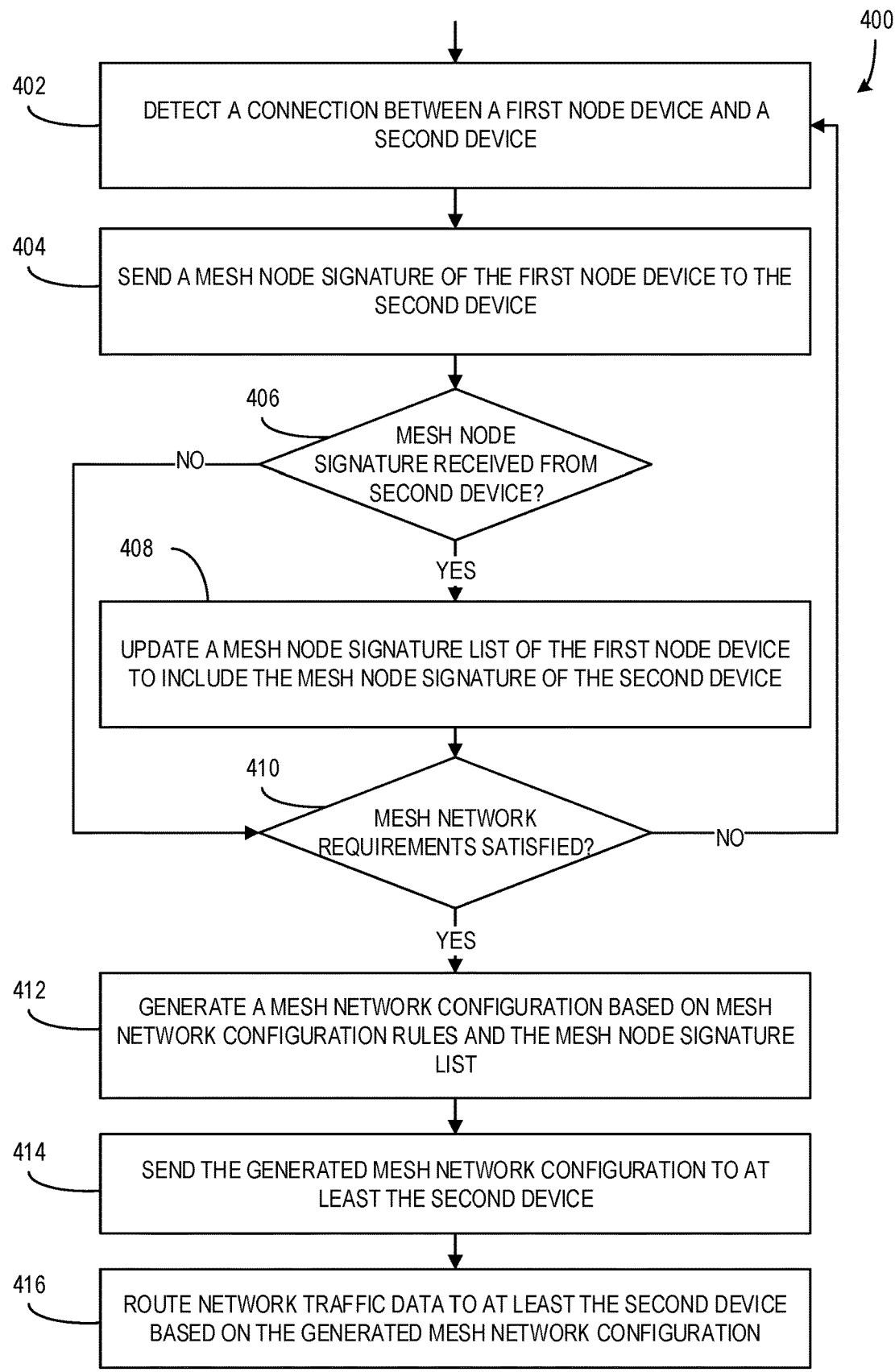
FIG. 4 is a flow chart illustrating a computerized method for configuring a mesh network by a node device of the mesh network according to an embodiment.

FIG. 4 is a flow chart illustrating a computerized method 400 for configuring a mesh network by a node device of the mesh network according to an embodiment. In some examples, the method 400 is performed or executed by a node device (e.g., node device 102, 202) and/or the components thereof. At 402, a connection between the first node device and a second device is detected. Detecting the connection may include detecting the connection of a cable or other interface between the first node device and second device and/or detection of the formation of a firmware or software-based connection via an established network protocol. Additionally, or alternatively, detecting the connection may include receiving a network connection request or message from the second device or otherwise exchanging network connection initiation information with the second device.

At 404, a mesh node signature of the first node device is sent to the second device. In some examples, the mesh node signature sent by the first node device is stored in the configuration (e.g., the node signature data 260 of the configuration 216) of the node device. Each node device of the mesh network includes unique node signature data as described herein. At 406, if a mesh node signature is received from the second device, the process proceeds to 408. In some examples, the exchange of mesh node signatures between the first node device and the second device is a result of a "handshake" between the two devices to confirm that each of the devices is configured for participation in a mesh network as described herein. In some examples, the mesh node signatures include identifiers of the source devices (e.g., an identifier of the first node device in the signature sent by the first node device and an identifier of the second device in the signature received from the second device) and indicators that the devices are configured for mesh network operations. Further, the mesh network signatures may include node connection data indicating other devices to which the source device is connected and/or other network connections or structures that make up an established mesh network if a mesh network is already formed.

At 408, a mesh node signature list of the first node device is updated to include the mesh node signature of the second device. In some examples, the mesh node signature list is stored by the first node device in node signature data store (e.g., the node signature data 260 of the configuration 216). It should be understood that the mesh node signature list of a node device may be an ordered or unordered list or other similar data structure without departing from the description. Each node device configured to operate in a mesh network as described herein may maintain a mesh node signature list based on connections formed therewith and/or other node signature information received by the node device from other devices. The updated node signature list includes the mesh node signature received from the second device and may also include associated network connection information, such as an indicator describing to which port or ports the second device is connected or other network connection information.

Alternatively, if a mesh node signature is not received from the second device or after the mesh node signature list of the first node device is updated, the process proceeds to 410. If, at 410, mesh network requirements are satisfied, the process proceeds to 412. Alternatively, if the mesh network requirements are not satisfied, the process returns to 402 to listen for more or different device connections to the first node device. Mesh network requirements include may include data indicating requirements associated with individual node devices and/or arrangements of node devices that are necessary to initially create a mesh network as described herein. The mesh network requirements may be stored in a file or other data structure on each node device that is configured to operate in a mesh network as described herein without departing from the description. In some examples, the mesh node requirements include a minimum quantity of devices that are configured to operate as mesh nodes as described herein (e.g., at least three mesh node devices are connected via network connections based on the mesh node signature list of at least one of the connected mesh node devices (one of the devices may have more up-to-date connection information than the other devices for a short period)). Additionally, or alternatively, mesh network requirements may also include more, fewer, or different requirements without departing from the description herein. For instance, it may be required for at least one of the mesh node devices to be connected to an external device (e.g., a device that is not configured to operate within the mesh network as described herein) in order to satisfy the mesh network requirements. Other requirements may be based on the mesh node devices being configured to operate within a defined set of access control or firewall requirements (e.g., all mesh node devices that are connected to external devices are configured to perform a minimum level of access control operations during exchanges with the external devices in order to protect the nodes of the mesh network).

At 412, once the mesh network requirements are satisfied at 410, a mesh network configuration (e.g., configuration 216) is generated by the first node device (e.g., by the configuration generator 264 of the node manager 226) based on mesh network configuration rules and the updated mesh node signature list of the first node device. In some examples, the configuration rules are applied to the node signature list to generate routing functions that describe how data traffic is to be routed through the mesh network. As described herein, the routing functions generated may include shortest routes (e.g., routes with the least number of device-to-device transfers). Further routing functions may also be generated and those routing functions may be classified and/or prioritized based on the configuration rules (e.g., multiple routing functions defining routes between two devices may be prioritized based on their relative lengths, relative performance factors, and/or relative traffic congestion factors). For instance, if a particular connection between two devices is used by many generated routing functions, routing functions that avoid that particular connection may be prioritized for some routes in order to spread traffic out to other connections that are likely to be less congested, thereby optimizing network bandwidth of the mesh network.

At 414, the generated mesh network configuration is sent to at least the second device by the first node device. In some examples, the generated mesh network configuration is sent to multiple devices to which the first node device is connected and that are configured to operate in a mesh network as described herein. Further, the generated mesh network configuration may be forwarded by those devices that receive it from the first node device to devices to which the first node device is not directly connected by that are also configured to operate in a mesh network. The first node device and each node device that receives the generated mesh network configuration is configured to enable the configuration, thereby configuring itself to operate in the mesh network according to the enabled configuration. In some examples, this may include activating a virtualized role-based OS as described herein.

At 416, the first node device routes network traffic data to at least the second device based on the generated mesh network configuration. Further, in some examples, other node devices of the established mesh network also route network traffic data to other node devices of the mesh network based on the generated mesh network configuration as described herein.

Figure 5:
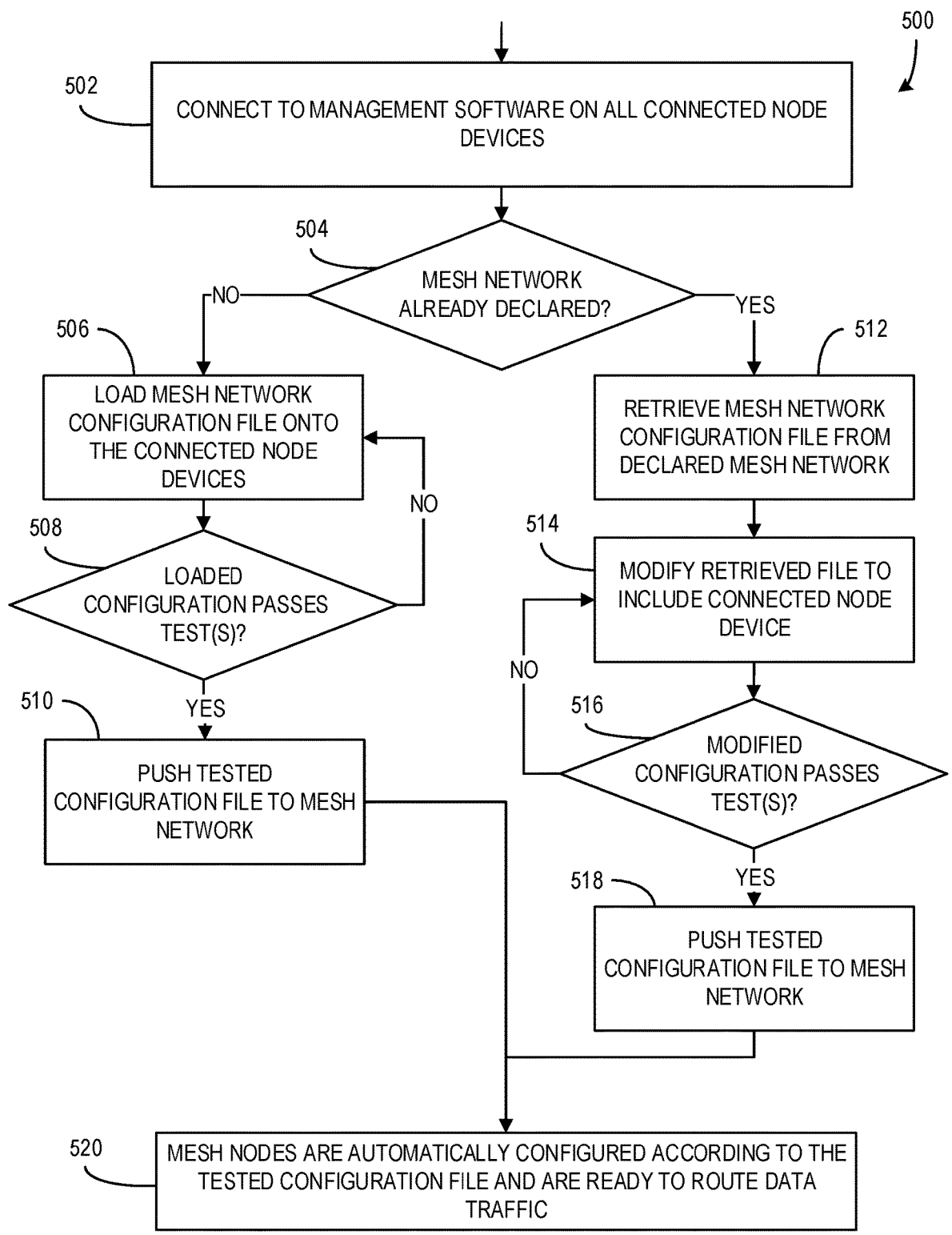
FIG. 5 is a flow chart illustrating a computerized method for creating and/or configuring a mesh network, including testing the configuration, by a node device of the mesh network according to an embodiment.

FIG. 5 is a flow chart illustrating a computerized method 500 for creating and/or configuring a mesh network, including testing the configuration, by a node device of the mesh network according to an embodiment. In some examples, the method 500 is performed or otherwise executed by one or more node devices and/or components thereof as described herein. For instance, some or all the processes of method 500 may be performed by a node device 202 as described above with respect to FIG. 2. At 502, a host device associated with a mesh network or otherwise configured to manage a mesh network as described herein (e.g., node device 202 or other node devices) connects to management software (e.g., node manager 226) on all connected node devices. In some examples, the host device connects to the management software on all the node devices to which it is directly connected. Additionally, the host device may also form connections to the management software of other node devices to which it is not directly connected, but indirectly connected via other node devices (e.g., as illustrated FIG. 1, if node device 102 is the host device, it may connect to the node managers 132 and 134 of node devices 108 and 110 respectively via connections to node devices 104 and/or 106, even though they are not directly connected).

If, at 502, a mesh network is not already declared or otherwise enabled, the process proceeds to 506. Alternatively, if a mesh network is already declared at 502, the process proceeds to 512. The declaration or enablement of a mesh network may be determined by the host device based on locally stored mesh network information, such as the presence of a mesh network configuration and/or the active state of a role-based OS. Alternatively, or additionally, the declaration or enablement of a mesh network may be determined by the host device based on communications with the management software of the other node devices (e.g., querying the other devices to determine whether they have active mesh network configurations or role-based OS's).

At 506, a mesh network configuration file (e.g., a "YAML Ain't Markup Language" (YAML) file or other markup file populated by configuration information) is loaded into the connected node devices. The mesh network configuration that is loaded may have been generated by the host device in a manner substantially the same as or like the configuration generation process described above (e.g., at 412 of FIG. 4). Loading the mesh network configuration may include sharing or otherwise sending the generated mesh network configuration to each of the node devices that is connected, directly or indirectly, to the host device via the established network connections.

At 508, if the loaded configuration passes one or more defined tests, the process proceeds to 510. Alternatively, if the loaded configuration does not pass the one or more defined tests, the process returns to 506, where a different configuration may be generated and loaded into the connected node devices.

The tests performed on the configuration may be tests designed to confirm that the configuration will enable the mesh network to correctly route data traffic (e.g., tests that test that data traffic is routed to the right destinations) as well as tests designed to confirm that the configuration will handle different kinds and/or quantities of data traffic correctly, and/or tests designed to confirm that the configuration will handle edge cases and/or other special cases correctly. For instance, the tests may simulate routing data between each pair of node devices and/or external egresses of the mesh network and confirm that the data reaches the desired destination. Further, the tests may simulate routing a large quantity of data between a pair of node devices and confirm that the mesh network handles the data routing within defined performance parameters (e.g., the data is routed within a time threshold and/or with fewer errors than a defined error threshold). In some examples, the tests are configured to route test data between the node devices of the mesh network and collect results of the data routing. Alternatively, or additionally, some or all the test may be configured to run in a virtual environment on the host device that simulates the data routing of the mesh network based on the configuration being tested.

At 510, after the test or tests have been passed by the configuration, the tested configuration file is pushed to the mesh network and enabled, such that, at 520, the node devices of the mesh network are configured to route traffic data according to the enabled configuration.

Alternatively, if, at 504, the mesh network is already declared the process proceeds to 512. At 512, the current mesh network configuration file of the declared mesh network is retrieved by the host device. In some examples, the host device may retrieve the current mesh network configuration from one or more of the connected mesh nodes via the established network connections. At 514, the host device modifies the retrieved configuration file to include the host device and/or any other recently connected node devices. The modification of the configuration file may include generation of a mesh network configuration that includes the host device and based on the current mesh network configuration file as described herein.

At 516, if the modified configuration passes a test or tests, the process proceeds to 518. Alternatively, if the modified configuration does not pass the test or tests, the process returns to 514 to create a different modified configuration. The testing at 516 and pushing of the tested configuration file to the mesh network is performed in substantially the same manner at 508 and 510, respectively. After the tested configuration file is pushed to the mesh network, the mesh nodes are automatically configured according to the tested configuration file and are ready to route data traffic in the mesh network at 520.

In further examples, a node device that detects a loss of connection to another node device or otherwise detects the removal of another node device in the mesh network, the node device is configured to generate a new mesh network configuration that reflects the loss of the connection or removal of the device and share it with the other node devices remaining in the mesh network as described herein. The node device may also test the newly generated mesh network configuration prior to activating it for use in routing data throughout the mesh network. In this way, the mesh network dynamically responds to the removal of a node device in a substantially similar way that it responds to the addition of a new node device.

Figure 6:
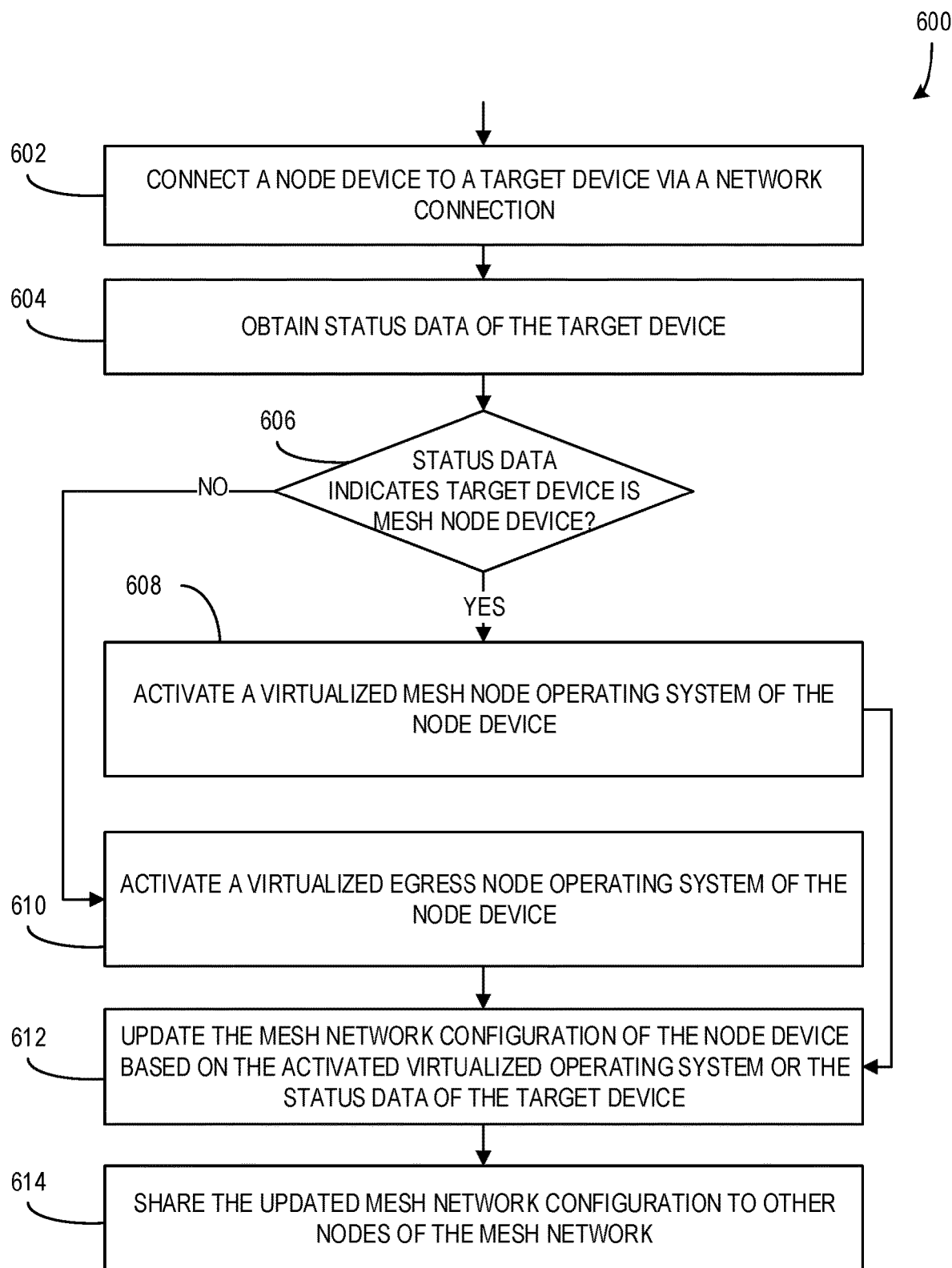
FIG. 6 is a flow chart illustrating a computerized method for configuring a node device in a mesh network to operate according to a node role using a virtualized operating system according to an embodiment.

FIG. 6 is a flow chart illustrating a computerized method 600 for configuring a node device in a mesh network to operate according to a node role using a virtualized OS according to an embodiment. In some examples, the method 600 is performed or otherwise executed by a node device (e.g., node device 202) and/or components thereof. At 602, the node device is connected to a target device by a network connection. It should be understood that the connection of the node device to the target device may be formed in any manner as previously described or otherwise without departing from the description.

At 604, status data of the target device is obtained by the node device. In some examples, the node device obtains the status data by requesting it from the target device or otherwise during an initial exchange of data with the target device. For instance, the node device may provide the target device with its mesh node signature during an exchange in which the node device obtains the status data. In some examples, the obtained status data includes a mesh node signature of the target device. Alternatively, the status data may include more, fewer, or different data values than a mesh node signature. It should be understood that the status data includes data that indicates information about the device type of the target device and/or information associated with a configuration of the target device.

If, at 606, the status data indicates that the target device is a mesh node device (e.g., the status data includes a mesh node signature indicating the target device is configured to operate in a mesh network as a node device as described herein), the process proceeds to 608. Alternatively, if the status data indicates that the target device is not a mesh node device (e.g., the status data indicates the target data is separate from the mesh network to which the node device is connected or otherwise not configured to operate as a mesh node in a mesh network as described herein), the process proceeds to 610.

At 608, the node device activates a virtualized mesh node OS (e.g. mesh OS's 138, 140, 142 and/or active role-based OS 270). The virtualized mesh node OS is configured to cause the node device to operate as a mesh node in a mesh network as described herein. For instance, the virtualized mesh node OS is configured to control the routing of data traffic through the node device to and from other node devices of the mesh network based on routing functions (e.g., routing functions 258) of the configuration (e.g., configuration 216) of the node device. After the virtualized mesh node OS is activated, the process proceeds to 612.

At 610, the node device activates a virtualized egress node OS (e.g., egress OS's 136, 144 and/or active role-based OS 270). The virtualized egress node OS is configured to cause the node device to operate as an egress node in a mesh network as described herein. For instance, the virtualized egress node OS is configured to control the routing of data traffic in to and out of the mesh network via the established network connection to the target device and/or other devices external of the mesh network. After the virtualized egress node OS is activated, the process proceeds to 612.

In some examples, if the node device is transitioning from a mesh node role to an egress node role, the node device is configured to transition between roles according to the following process. While a mesh node OS is active on the node device, a virtualized egress node OS is prepared for activation (e.g., an external network port through which the node device is connected to the target device is provided to the egress node OS for use in routing data traffic). The current mesh network traffic through the node device is "bled off" or otherwise reduced over a period of time. As data traffic to each network port of the node device that was in use by the mesh node OS is stopped, those network ports are provided to the egress node OS for use in configuring the egress node OS. The egress node OS may be activated to handle egress data traffic using the ports that have been completely transitioned. Once all the network ports have been transitioned to the egress node OS, the mesh node OS is halted and the egress node OS remains active, such that the node device is now operating as an egress node, not a mesh node, in the mesh network. It should be understood that, in other examples, such as when the node device transitions from an egress node role to a mesh node role, the same or a similar process may be performed by the node device to encourage a smooth transition between roles.

At 612, the mesh network configuration (e.g., configuration 216) of the node device is updated based on the activated virtualized OS and/or the status data of the target device. For instance, the mesh network configuration may be updated to reflect that the node device is now performing the role associated with the activated virtualized OS in the mesh network (e.g., the node device is not operating as a mesh node or an egress node, depending on the activated OS type). Further, updating the mesh network configuration may include making updates to the configuration based on the status data of the target device. For instance, the updated mesh network configuration may reflect an identifier of the target device (e.g., such as a network address, Internet protocol (IP) address, or the like) and/or an indicator that the target device is available as a source and/or destination for data traffic. It should be understood that updating the mesh network configuration may be done in a manner that is substantially the same as or similar to the generation of a mesh network configuration as described previously with respect to at least the configuration generator 264 of FIG. 2.

At 614, the updated mesh network configuration is shared to the other node devices of the mesh network, such that all the node devices of the mesh network have synchronized configurations with which to route data traffic. In some examples, the node device may be configured to test the updated mesh network configuration as previously described prior to the mesh network configuration being enabled throughout the mesh network for use in routing data traffic therein.

Additional Example Scenarios

Aspects of the disclosure enable various additional scenarios, such as next described.

In an example, three computing devices configured to operate as node devices are connected to each other via network connections. The three computing devices exchange mesh node signatures with each other. One of the node devices, upon receiving the mesh node signatures of the other two node devices, confirms that defined mesh network requirements are satisfied and generates a mesh network configuration that includes routing functions for routing data between all three node devices. The mesh network configuration is shared with the other two node devices and enabled, such that the three node devices are configured to operate as a mesh network.

Further, a node device of the mesh network is connected to another computing device via a network connection. The node device requests status data from the newly connected computing device and receives status data that indicates the computing device is not configured to operate as a mesh node in a mesh network. The node device then activates a virtualized egress node OS on a VCI and transitions from a mesh node role to an egress node role. Based on the transition to the egress node role, the node device updates the mesh network configuration to reflect the egress node connection to the new computing device. The updated mesh network configuration is then tested by the node device and, upon passing the tests, the updated mesh network is shared with all the node devices of the mesh network and enabled, such that all the node devices are configured to operate according to the updated mesh network configuration.

In another example, a mesh network includes a plurality of node devices that are configured to operate as mesh nodes and/or egress nodes within the mesh network. A node device of the mesh network detects the removal of a connection to another node device of the mesh network. Upon detecting the loss of the network connection, the node device generates a mesh network configuration of the mesh network that reflects the loss of the connection between the node device and the node device that was removed. The node device then performs a plurality of tests on the generated mesh network. The node device determines that the mesh network configuration failed at least one test of the plurality of tests and generates another mesh network configuration to replace it. The new configuration is tested and, upon passing the tests, the node device shares the configuration with the other remaining node devices in the mesh network. The new configuration is enabled, and the node devices of the mesh network are configured to route data according to the new configuration.

Exemplary Operating Environment

Figure 7:
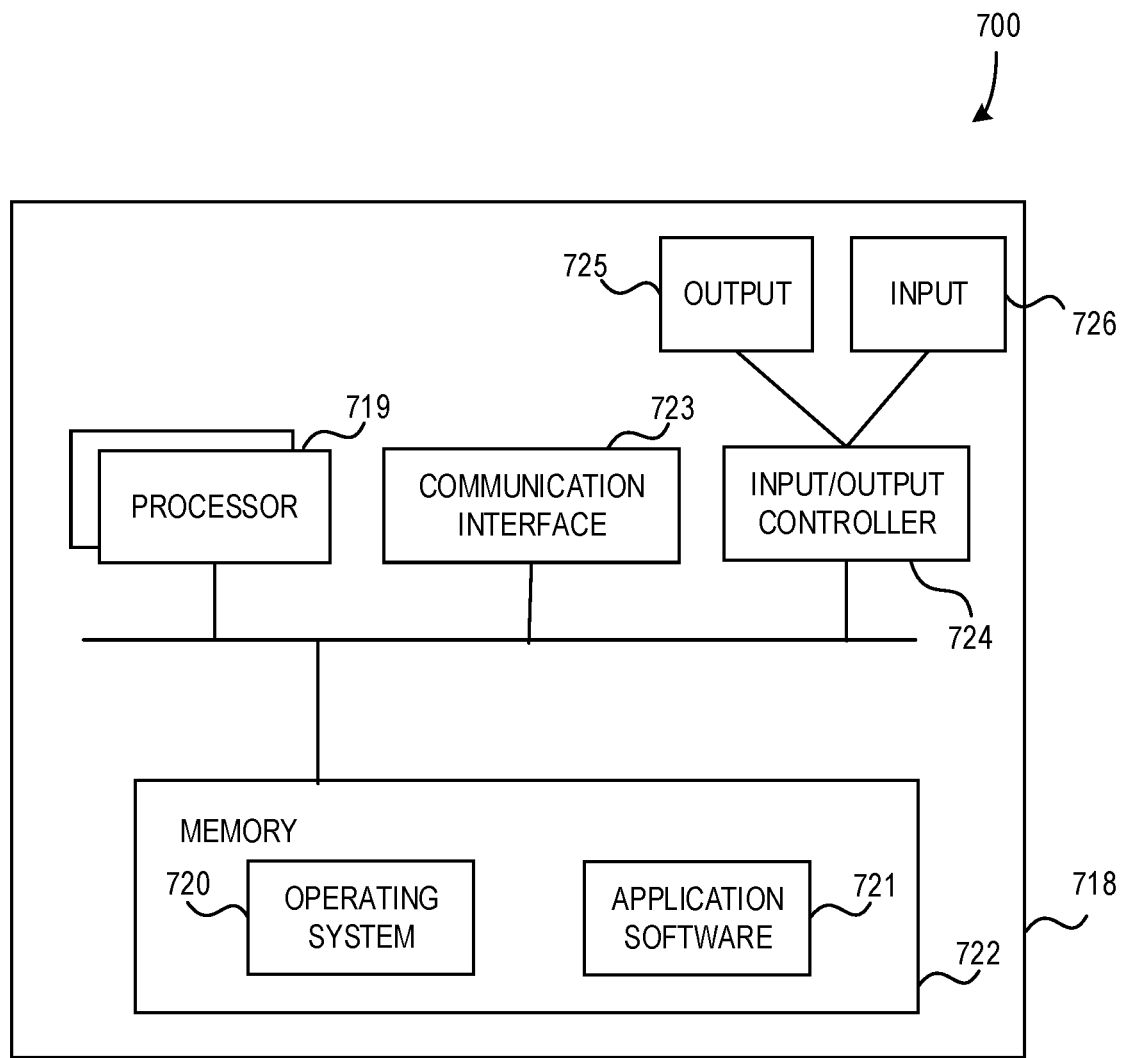
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, automatically managing the configuration of a mesh network based on dynamically self-configuring node devices as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for automatically managing a role of a node device in a mesh network comprises: at least one processor of the node device; and at least one memory comprising computer program code, the at least one memory and the computer program code configured to, with the at least one processor, cause the at least one processor to: based on connecting the node device to a target device via a network connection, obtain status data of the target device; based on the status data of the target device indicating the target device is configured as a mesh node device, activate a virtualized operating system to operate as a mesh node operating system of the node device that configures the node device to route network traffic data to at least the target device based on a mesh network configuration; based on the status data of the target device indicating the target device is configured as a device that is separate from the mesh network to which the node device is connected, activate the virtualized operating system to operate as an egress node operating system of the node device that configures the node device to route network traffic data into or out of the mesh network via the network connection to the target device; update the mesh network configuration of the node device based on at least one of the activated virtualized operating system of the node device or the status data of the target device; and share the updated mesh network configuration to at least one other node device of the mesh network, whereby the mesh network is configured to route network traffic data between the node device and the target device based on the updated mesh network configuration.

A computerized method for automatically managing a role of a node device in a mesh network comprises: based on connecting the node device to a target device via a network connection, obtaining, by the node device, status data of the target device; based on the status data of the target device indicating the target device is configured as a mesh node device, activating, by the node device, a virtualized operating system to operate as a mesh node operating system of the node device that configures the node device to route network traffic data to at least the target device based on a mesh network configuration; based on the status data of the target device indicating the target device is configured as a device that is separate from the mesh network to which the node device is connected, activating, by the node device, the virtualized operating system to operate as an egress node operating system of the node device that configures the node device to route network traffic data into or out of the mesh network via the network connection to the target device; updating, by the node device, the mesh network configuration of the node device based on at least one of the activated virtualized operating system of the node device or the status data of the target device; and sharing, by the node device, the updated mesh network configuration to at least one other node device of the mesh network, whereby the mesh network is configured to route network traffic data between the node device and the target device based on the updated mesh network configuration.

One or more non-transitory computer storage media have computer-executable instructions for automatically managing a role of a node device in a mesh network that, upon execution by a processor of a first node device, cause the processor to at least: based on connecting the node device to a target device via a network connection, obtain status data of the target device; based on the status data of the target device indicating the target device is configured as a mesh node device, activate a virtualized operating system to operate as a mesh node operating system of the node device that configures the node device to route network traffic data to at least the target device based on a mesh network configuration; based on the status data of the target device indicating the target device is configured as a device that is separate from the mesh network to which the node device is connected, activate the virtualized operating system to operate as an egress node operating system of the node device that configures the node device to route network traffic data into or out of the mesh network via the network connection to the target device; update the mesh network configuration of the node device based on at least one of the activated virtualized operating system of the node device or the status data of the target device; and share the updated mesh network configuration to at least one other node device of the mesh network, whereby the mesh network is configured to route network traffic data between the node device and the target device based on the updated mesh network configuration.

Alternatively, or in addition to the other examples described herein, examples include any combination of the following:

further comprising: performing, by the node device, one or more node device tests based on the updated mesh network configuration of the node device, wherein sharing the updated mesh network configuration to at least one other node device of the mesh network is based on results of the performed one or node device tests indicating that the node device passed one or more of the one or more node device tests.

wherein the activated virtualized operating system is further configured to perform access control operations based on the updated mesh network configuration indicating that the node device should perform a firewall role.

wherein the access control operations include the node device filtering network traffic data received from the target device based on defined access control rules.

wherein activating the virtualized operating system to operate as the egress node operating system of the node device is based on a transition from the node device performing a mesh node role to the node device performing an egress node role and further includes deactivating the virtualized operating system that is operating as the mesh node operating system of the node device to transition between a mesh node role and an egress node role.

further comprising: based on the transition from the node device performing the mesh node role to the node device performing the egress node role, rerouting, by the node device, internal mesh network traffic data away from the node device; and providing, by the node device, an external network port of the target device to the mesh network via the updated mesh network configuration.

wherein connecting the node device to the target device includes: enabling, by the node device, a network port of the node device via which the network connection is established; and sending, by the node device, a status inquiry message to the target device via the network connect; wherein obtaining the status data of the target device is based on the target device responding to the status inquiry message.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for obtaining, by the node device, status data of the target device based on connecting the node device to the target device via a network connection; based on the status data of the target device indicating the target device is configured as a mesh node device, exemplary means for activating, by the node device, a virtualized operating system to operate as a mesh node operating system of the node device that configures the node device to route network traffic data to at least the target device based on a mesh network configuration; based on the status data of the target device indicating the target device is configured as a device that is separate from the mesh network to which the node device is connected, exemplary means for activating, by the node device, the virtualized operating system to operate as an egress node operating system of the node device that configures the node device to route network traffic data into or out of the mesh network via the network connection to the target device; exemplary means for updating, by the node device, the mesh network configuration of the node device based on at least one of the activated virtualized operating system of the node device or the status data of the target device; and exemplary means for sharing, by the node device, the updated mesh network configuration to at least one other node device of the mesh network, whereby the mesh network is configured to route network traffic data between the node device and the target device based on the updated mesh network configuration.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automatically managing a role of a node device in a mesh network, the system comprising:
   at least one processor of the node device; and
   at least one memory comprising computer program code, the at least one memory and the computer program code configured to, with the at least one processor, cause the at least one processor to:
   based on connecting the node device to a target device via a network connection, obtain status data of the target device, the node device comprising a plurality of virtualized operating systems;
   based on the status data of the target device indicating the target device is configured as a mesh node device, activate a first virtualized operating system to operate as a mesh node operating system of the node device that configures the node device to route network traffic data to at least the target device based on a mesh network configuration;
   based on the status data of the target device indicating the target device is configured as a device that is separate from the mesh network to which the node device is connected, and based on a transition from the node device performing a mesh node role to the node device performing an egress node role, activate a second virtualized operating system to operate as an egress node operating system of the node device that configures the node device to route network traffic data into or out of the mesh network via the network connection to the target device, and deactivate the first virtualized operating system that is operating as the mesh node operating system of the node device to transition between the mesh node role and the egress node role;

update the mesh network configuration of the node device based on at least one of: the activated virtualized operating system of the node device, or the status data of the target device; and share the updated mesh network configuration to at least one other node device of the mesh network, whereby the mesh network is configured to route network traffic data between the node device and the target device based on the updated mesh network configuration.

2. The system of claim 1, wherein the at least one memory and the computer program code are configured to, with the at least one processor, further cause the processor to:

perform one or more node device tests based on the updated mesh network configuration of the node device, wherein sharing the updated mesh network configuration to at least one other node device of the mesh network is based on results of the performed one or node device tests indicating that the node device passed the performed one or more node device tests.

3. The system of claim 1, wherein the activated virtualized operating system is further configured to perform access control operations based on the updated mesh network configuration indicating that the node device should perform a firewall role.

4. The system of claim 3, wherein the access control operations include the node device filtering network traffic data received from the target device based on defined access control rules.

5. The system of claim 1, wherein during the transition from the node device performing the mesh node role to the node device performing the egress node role, the node device having two active instances of: the first virtualized operating system in the mesh node role and the second virtualized operating system in the egress node role.

6. The system of claim 1, wherein the at least one memory and the computer program code are configured to, with the at least one processor, further cause the processor to:

based on the transition from the node device performing the mesh node role to the node device performing the egress node role, reroute internal mesh network traffic data away from the node device; and provide an external network port of the target device to the mesh network via the updated mesh network configuration.

7. The system of claim 1, wherein connecting the node device to the target device includes:

enabling a network port of the node device via which the network connection is established;

sending a status inquiry message to the target device via the network connection; and wherein obtaining the status data of the target device is based on the target device responding to the status inquiry message.

8. A computerized method for automatically managing a role of a node device in a mesh network, the method comprising:

based on connecting the node device to a target device via a network connection, obtaining, by the node device, status data of the target device, the node device comprising a plurality of virtualized operating systems;

based on the status data of the target device indicating the target device is configured as a mesh node device, activating, by the node device, a first virtualized operating system to operate as a mesh node operating system of the node device that configures the node device to route network traffic data to at least the target device based on a mesh network configuration;

based on the status data of the target device indicating the target device is configured as a device that is separate from the mesh network to which the node device is connected, and based on a transition from the node device performing a mesh node role to the node device performing an egress node role activating, by the node device, a second virtualized operating system to operate as an egress node operating system of the node device that configures the node device to route network traffic data into or out of the mesh network via the network connection to the target device, and deactivating the first virtualized operating system that is operating as the mesh node operating system of the node device to transition between the mesh node role and the egress node role;

updating, by the node device, the mesh network configuration of the node device based on at least one of: the activated virtualized operating system of the node device, or the status data of the target device; and sharing, by the node device, the updated mesh network configuration to at least one other node device of the mesh network, whereby the mesh network is configured to route network traffic data between the node device and the target device based on the updated mesh network configuration.

9. The computerized method of claim 8, the method further comprising:

performing, by the node device, one or more node device tests based on the updated mesh network configuration of the node device, wherein sharing the updated mesh network configuration to at least one other node device of the mesh network is based on results of the performed one or node device tests indicating that the node device passed the performed one or more node device tests.

10. The computerized method of claim 8, wherein the activated virtualized operating system is further configured to perform access control operations based on the updated mesh network configuration indicating that the node device should perform a firewall role.

11. The computerized method of claim 10, wherein the access control operations include the node device filtering network traffic data received from the target device based on defined access control rules.

12. The computerized method of claim 8, wherein connecting the node device to the target device includes:

enabling, by the node device, a network port of the node device via which the network connection is established;

sending, by the node device, a status inquiry message to the target device via the network connection; and wherein obtaining the status data of the target device is based on the target device responding to the status inquiry message.

13. The computerized method of claim 8, the method further comprising:

based on the transition from the node device performing the mesh node role to the node device performing the egress node role, rerouting, by the node device, internal mesh network traffic data away from the node device; and providing, by the node device, an external network port of the target device to the mesh network via the updated mesh network configuration.

14. The computerized method of claim 8, wherein during the transition from the node device performing the mesh node role to the node device performing the egress node role, the node device having two active instances of the first virtualized operating system in the mesh node role and the second virtualized operating system in the egress node role.

15. One or more non-transitory computer storage media having computer-executable instructions for automatically managing a role of a node device in a mesh network that, upon execution by a processor of a first node device, cause the processor to at least:

based on connecting the node device to a target device via a network connection, obtain status data of the target device, the node device comprising a plurality of virtualized operating systems;

based on the status data of the target device indicating the target device is configured as a mesh node device, activate a first virtualized operating system to operate as a mesh node operating system of the node device that configures the node device to route network traffic data to at least the target device based on a mesh network configuration;

based on the status data of the target device indicating the target device is configured as a device that is separate from the mesh network to which the node device is connected, and based on a transition from the node device performing a mesh node role to the node device performing an egress node role, activate a second virtualized operating system to operate as an egress node operating system of the node device that configures the node device to route network traffic data into or out of the mesh network via the network connection to the target device, and deactivating the first virtualized operating system that is operating as the mesh node operating system of the node device to transition between the mesh node role and the egress node role;

update the mesh network configuration of the node device based on at least one of: the activated virtualized operating system of the node device, or the status data of the target device; and share the updated mesh network configuration to at least one other node device of the mesh network, whereby the mesh network is configured to route network traffic data between the node device and the target device based on the updated mesh network configuration.

16. The one or more non-transitory computer storage media of claim 15, wherein the computer-executable instructions, upon execution by a processor, further cause the processor to at least:

perform one or more node device tests based on the updated mesh network configuration of the node device, wherein sharing the updated mesh network configuration to at least one other node device of the mesh network is based on results of the performed one or node device tests indicating that the node device passed the performed one or more node device tests.

17. The one or more non-transitory computer storage media of claim 15, wherein the activated virtualized operating system is further configured to perform access control operations based on the updated mesh network configuration indicating that the node device should perform a firewall role.

18. The one or more non-transitory computer storage media of claim 17, wherein the access control operations include the node device filtering network traffic data received from the target device based on defined access control rules.

19. The one or more non-transitory computer storage media of claim 15, wherein during the transition from the node device performing the mesh node role to the node device performing the egress node role, the node device having two active instances of: the first virtualized operating system in the mesh node role and the second virtualizod operating system in the egress node role.

20. The one or more non-transitory computer storage media of claim 15, wherein the computer-executable instructions, upon execution by a processor, further cause the processor to at least:

based on the transition from the node device performing the mesh node role to the node device performing the egress node role, reroute internal mesh network traffic data away from the node device; and provide an external network port of the target device to the mesh network via the updated mesh network configuration.

* * * * *